(12) United States Patent
Kirazci et al.

(10) Patent No.: US 9,536,016 B2
(45) Date of Patent: Jan. 3, 2017

(54) ON-DISK MULTIMAP

(71) Applicant: Google Inc., Mountain View, CA (US)

(72) Inventors: Ulas Kirazci, Mountain View, CA (US); Scott Banachowski, Mountain View, CA (US)

(73) Assignee: Google Inc., Mountain View, CA (US)

(*) Notice: Subject to any disclaimer, the term of this patent is extended or adjusted under 35 U.S.C. 154(b) by 456 days.

(21) Appl. No.: 13/970,802

(22) Filed: Aug. 20, 2013

(65) Prior Publication Data

US 2014/0201474 A1 Jul. 17, 2014

Related U.S. Application Data

(60) Provisional application No. 61/753,057, filed on Jan. 16, 2013.

(51) Int. Cl.
  *G06F 12/00* (2006.01)
  *G06F 13/00* (2006.01)
  *G06F 13/28* (2006.01)
  *G06F 17/30* (2006.01)

(52) U.S. Cl.
  CPC .................. *G06F 17/30961* (2013.01)

(58) Field of Classification Search
  CPC ..................... G06F 12/06; G06F 17/30961
  USPC ......................................... 711/154
  See application file for complete search history.

(56) References Cited

U.S. PATENT DOCUMENTS

| | | | | |
|---|---|---|---|---|
| 5,010,478 A | * | 4/1991 | Deran | ............. G06F 17/30327 |
| 5,202,986 A | * | 4/1993 | Nickel | ............. G06F 17/30955 |
| 6,396,842 B1 | * | 5/2002 | Rochberger | ............. H04L 45/02 370/255 |
| 6,920,455 B1 | * | 7/2005 | Weschler | ............. G06F 17/30286 |
| 7,031,985 B1 | * | 4/2006 | Pecheny | ............. G06F 17/30985 |
| 7,058,639 B1 | * | 6/2006 | Chatterjee | ............. G06F 17/3033 |
| 7,096,228 B2 | * | 8/2006 | Theimer | ............. H04L 29/12066 |
| 7,424,477 B1 | * | 9/2008 | Martin | ............. G06F 9/524 |
| 7,672,945 B1 | * | 3/2010 | Chatterjee | ............. G06F 17/30997 707/999.009 |
| 7,827,182 B1 | * | 11/2010 | Panigrahy | ............. G06F 17/30067 707/747 |
| 8,407,259 B2 | * | 3/2013 | Connell | ............. G06F 17/30327 707/741 |
| 8,612,402 B1 | * | 12/2013 | Givargis | ............. G06F 17/30306 707/693 |

(Continued)

OTHER PUBLICATIONS

Stack Overflow, "I need a slightly different multimap", downloaded from the internet on Aug. 20, 2013, http://stackoverflow.com/questions/455251/i-need-a-slightly-different-multimap, 2 pages.

(Continued)

*Primary Examiner* — Sheng-Jen Tsai

(74) *Attorney, Agent, or Firm* — Fish & Richardson P.C.

(57) ABSTRACT

Methods, systems, and apparatus, including computer programs encoded on a computer storage medium, for storing data on in a storage medium. In one aspect, a method includes receiving a key-value pair including a key k and a value v. The method further includes encoding the key-value pair as (i) a first key-value pair including a first key k1 and first value v1, and (ii) a second key-value pair including a second key k2. The method further includes inserting the first key-value pair and the second key-value pair in a trie.

18 Claims, 6 Drawing Sheets

(56) References Cited

U.S. PATENT DOCUMENTS

| | | | | |
|---|---|---|---|---|
| 8,768,931 | B2* | 7/2014 | Das | G06F 17/30917 707/705 |
| 8,938,469 | B1* | 1/2015 | Keen | H04L 45/7453 707/747 |
| 9,043,371 | B1* | 5/2015 | Fuller | G06F 17/30286 707/702 |
| 9,134,908 | B2* | 9/2015 | Horn | G06F 3/0607 |
| 2002/0118682 | A1* | 8/2002 | Choe | H04L 45/00 370/395.31 |
| 2002/0133641 | A1* | 9/2002 | Royer | G06F 21/41 719/329 |
| 2002/0174355 | A1* | 11/2002 | Rajasekaran | G06F 17/30964 713/193 |
| 2004/0044868 | A1* | 3/2004 | Guerrero | H04L 45/7457 711/164 |
| 2004/0085953 | A1* | 5/2004 | Davis | H04L 45/00 370/356 |
| 2004/0133590 | A1* | 7/2004 | Henderson | G06F 17/30327 |
| 2004/0205229 | A1* | 10/2004 | Stojancic | G11C 7/1006 709/236 |
| 2004/0210582 | A1* | 10/2004 | Chatterjee | G06F 17/30575 |
| 2005/0027679 | A1* | 2/2005 | Sample | G06F 17/30625 |
| 2005/0080792 | A1* | 4/2005 | Ghatare | G06F 17/30569 |
| 2005/0182776 | A1* | 8/2005 | Yennie | G06F 17/30327 |
| 2005/0235154 | A1* | 10/2005 | Serret-Avila | G06F 21/64 713/176 |
| 2006/0136728 | A1* | 6/2006 | Gentry | H04L 9/3242 713/176 |
| 2007/0028217 | A1* | 2/2007 | Mishra | G06F 11/3688 717/124 |
| 2007/0061546 | A1* | 3/2007 | Berger | H03M 7/30 711/202 |
| 2007/0201458 | A1* | 8/2007 | Thron | H04L 47/10 370/389 |
| 2008/0181103 | A1* | 7/2008 | Davies | H04L 47/125 370/230 |
| 2008/0215849 | A1* | 9/2008 | Scott | G06F 17/30949 711/216 |
| 2008/0307181 | A1* | 12/2008 | Kuszmaul | G06F 11/1471 711/164 |
| 2009/0077076 | A1* | 3/2009 | Berger | G06F 17/30327 |
| 2009/0198899 | A1* | 8/2009 | Revanuru | G06F 12/0842 711/128 |
| 2010/0076940 | A1* | 3/2010 | Bordawekar | G06F 17/30961 707/704 |
| 2010/0198849 | A1* | 8/2010 | Thomas | G06F 17/30067 707/758 |
| 2010/0299438 | A1* | 11/2010 | Zimmerman | H04N 7/17318 709/226 |
| 2011/0246503 | A1* | 10/2011 | Bender | G06F 17/30306 707/769 |
| 2011/0276744 | A1* | 11/2011 | Sengupta | G06F 12/0866 711/103 |
| 2011/0276789 | A1* | 11/2011 | Chambers | G06F 9/445 712/220 |
| 2011/0307436 | A1* | 12/2011 | Cai | G06F 17/30864 706/48 |
| 2012/0047181 | A1* | 2/2012 | Baudel | G06F 17/30327 707/797 |
| 2012/0078871 | A1* | 3/2012 | Pugh | G06F 17/3071 707/706 |
| 2012/0144355 | A1* | 6/2012 | Dai | G06F 17/5081 716/112 |
| 2012/0197825 | A1* | 8/2012 | Medlock | G06N 3/084 706/11 |
| 2012/0223889 | A1* | 9/2012 | Medlock | 345/168 |
| 2013/0031077 | A1* | 1/2013 | Liu | G06F 7/02 707/706 |
| 2013/0036477 | A1* | 2/2013 | Goyal | G06N 5/02 726/27 |
| 2013/0042060 | A1* | 2/2013 | Marukame | G06F 17/30982 711/108 |
| 2013/0110961 | A1* | 5/2013 | Jadhav | G06F 15/167 709/213 |
| 2013/0227195 | A1* | 8/2013 | Beaverson | G06F 17/30097 711/103 |
| 2013/0250686 | A1* | 9/2013 | Marukame | G11C 16/08 365/185.12 |
| 2013/0268770 | A1* | 10/2013 | Hunt | G06F 17/3033 713/189 |
| 2013/0275656 | A1* | 10/2013 | Talagala | G06F 12/0246 711/103 |
| 2013/0339000 | A1* | 12/2013 | Zhang | G06F 17/277 704/9 |
| 2014/0136760 | A1* | 5/2014 | Sprouse | G06F 12/0246 711/103 |
| 2014/0136764 | A1* | 5/2014 | Li | G11C 16/08 711/103 |
| 2014/0189118 | A1* | 7/2014 | Hunter | H04L 65/40 709/225 |
| 2014/0344453 | A1* | 11/2014 | Varney | H04L 67/10 709/224 |
| 2015/0009222 | A1* | 1/2015 | Diard | G06F 9/45533 345/505 |
| 2015/0194136 | A1* | 7/2015 | Diard | G09G 5/393 345/547 |

OTHER PUBLICATIONS

Multi-Mapping-Bit-Trie-Class, downloaded from the internet on Aug. 20, 2013, https://code.google.com/p/multi-mapping-bit-trie-class/, 2 pages.

Demetriades, Socrates et al., "An Efficient Hardware-based Multi-has Scheme for High Speed IP Lookup", Proceedings of the 16th IEEE Symposium on High Performance Interconnects (HOTI '08), 2008, 8 pages.

Hung, Zhuo et al., "Fast Routing Table Lookup Based on Deterministic Multi-hashing", 18th IEEE International Conference on Network Protocols (ICNP), 2010, 10 pages.

* cited by examiner

ON-DISK MULTIMAP

CROSS-REFERENCE TO RELATED APPLICATION

This application claims the benefit of U.S. Provisional Application Ser. No. 61/753,057, filed on Jan. 16, 2013, which is incorporated by reference.

TECHNICAL FIELD

This specification generally relates to data storage, and one particular implementation relates to storing data in a trie.

BACKGROUND

Computing devices use data structures to efficiently store and access data. Different data structures may be better at handling large amounts of data, accessing data, or minimizing storage space. Some data structures are a collection of key-value pairs where the computing device uses the key to access one or more values that correspond to the key.

A multimap is a data structure that stores key-value pairs. The data type for each key and value can vary according to the type of multimap, but can include strings and integers. Each key can map to more than one value. For example, the key "chocolate" can map to both "cake" and "pudding" such that the multimap will return both values "cake" and "pudding" when given the key "chocolate."

A trie is a data structure that stores key-value pairs. In a trie, the keys and the values can be strings or integers, and each key can only map to one value. Some tries, such as the ones discussed in this application, may limit the values to integers. A trie is tree structure such that a root node is linked to a number of nodes and each of those nodes can link to other nodes. Linked nodes contain keys. Nodes can also link to leaves. A leaf is a type of node that contains a value that corresponds to a key. Leaves do not link to additional nodes. Each node contains one character, and each leaf contains an integer. For example, to access the value for the key "chocolate," a computing device traverses the nodes of the trie that contain the letters "c," "h," "o," "c," "o," "l," "a," "t," and "e." The node "e" links to the leaf that contains the value for "386" which is the value for the key "chocolate."

SUMMARY

According to an innovative aspect of the subject matter described in this specification, a device can use a trie to store data. The key-value pairs stored in the trie are not limited to string-integer pairs, and each key can map to more than one value. To insert an original key-value pair into the trie, a computing device encodes the original key and inserts the encoded original key into the trie. The device determines a hash value of the original value and inserts the hash value of the original value as the value of the encoded original key. The device appends the value of the encoded original key, the hash value of the original value, and a fixed string and inserts the appended value of the encoded original key, hash value of the original value, and fixed string as a second key.

To retrieve a value for a given an original key, the device encodes the original key and uses the encoded original key to retrieve a value of the encoded original key. Using the value of the encoded original key, the device determines a second key. The device traverses the trie along the nodes of the second key. Once the device reaches the end of the second key, the device continues to traverse the trie until the device reaches a leaf. The nodes between the end of the second key and the leaf is the value that matches the original key.

In general, another innovative aspect of the subject matter described in this specification may be embodied in methods that include the actions of receiving a key-value pair including a key k and a value v; encoding the key-value pair as (i) a first key-value pair including a first key k1 and first value v1, and (ii) a second key-value pair including a second key k2; and inserting the first key-value pair and the second key-value pair in a trie.

These and other embodiments can each optionally include one or more of the following features. The action of encoding the key-value pair as (i) a first key-value pair including a first key k1 and first value v1, and (ii) a second key-value pair including a second key k2 includes determining a length of the key k; and encoding a prefix of the first key k1, the encoded prefix of the first key k1 including a first predetermined byte; data reflecting the length of the key k; and the key k. The actions further including determining a number of values that are in the trie and that correspond to the prefix of the first key k1.

The action of encoding the key-value pair as (i) a first key-value pair including a first key k1 and first value v1, and (ii) a second key-value pair including a second key k2 includes encoding the first key k1, the encoded first key k1 including the prefix of the first key k1; and the number of values that are in the trie and that correspond to the prefix of the first key k1. The action of encoding the key-value pair as (i) a first key-value pair including a first key k1 and first value v1, and (ii) a second key-value pair including a second key k2 includes encoding the first value v1 as a hash of the value v. The action of encoding the key-value pair as (i) a first key-value pair including a first key k1 and first value v1, and (ii) a second key-value pair including a second key k2 includes encoding a prefix of the second key k2, the encoded prefix of the second key k2 including a second predetermined byte; and a hash of the value v.

The action of claim 1, wherein encoding the key-value pair as (i) a first key-value pair including a first key k1 and first value v1, and (ii) a second key-value pair including a second key k2 includes encoding the second key k2, the encoded second key k2 including the prefix of the second key k2; and the first value v1. The second key-value pair includes a second value v2 including a number of occurrences of the value v associated in the trie with the prefix of the first key k1. The first value v1 is an integer.

Another innovative aspect of the subject matter described in this specification may be embodied in methods that include the actions of receiving a key k; encoding the key k; retrieving a value v1 for the encoded key k from a trie in which each key-value pairs are stored as (i) a first key-value pair including a first key and first value, and (ii) a second key-value pair including a second key; encoding a key k1 based on the value v1; accessing the trie using the encoded key k1; extracting a particular key associated with the encoded key k1; and outputting the particular key as a value associated with the key k.

These and other embodiments can each optionally include one or more of the following features. The encoded key k includes a first predetermined byte; data reflecting a length of the key k; a delimiter; and the key k. The actions further include retrieving a second value v2 for the encoded key k from the trie; encoding a key k2 based on the value v2; accessing the trie using the encoded key k2; extracting a second particular key associated with the encoded key k1; and outputting the second particular key as a second value associated with the key k.

The action of encoding a key k1 based on the value v1 includes converting the value v1 to hexadecimal form; and setting the encoded key k1 to the converted value v1. The action of extracting a particular key associated with the encoded key k1 includes accessing subsequent nodes of the trie after accessing the trie using the encoded key k1; and outputting the subsequent nodes as the particular key. The value v1 is an integer.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. For example, the trie can store key-value pairs where the key is a string and the value is a string. The trie can store multiple values that correspond to one key.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
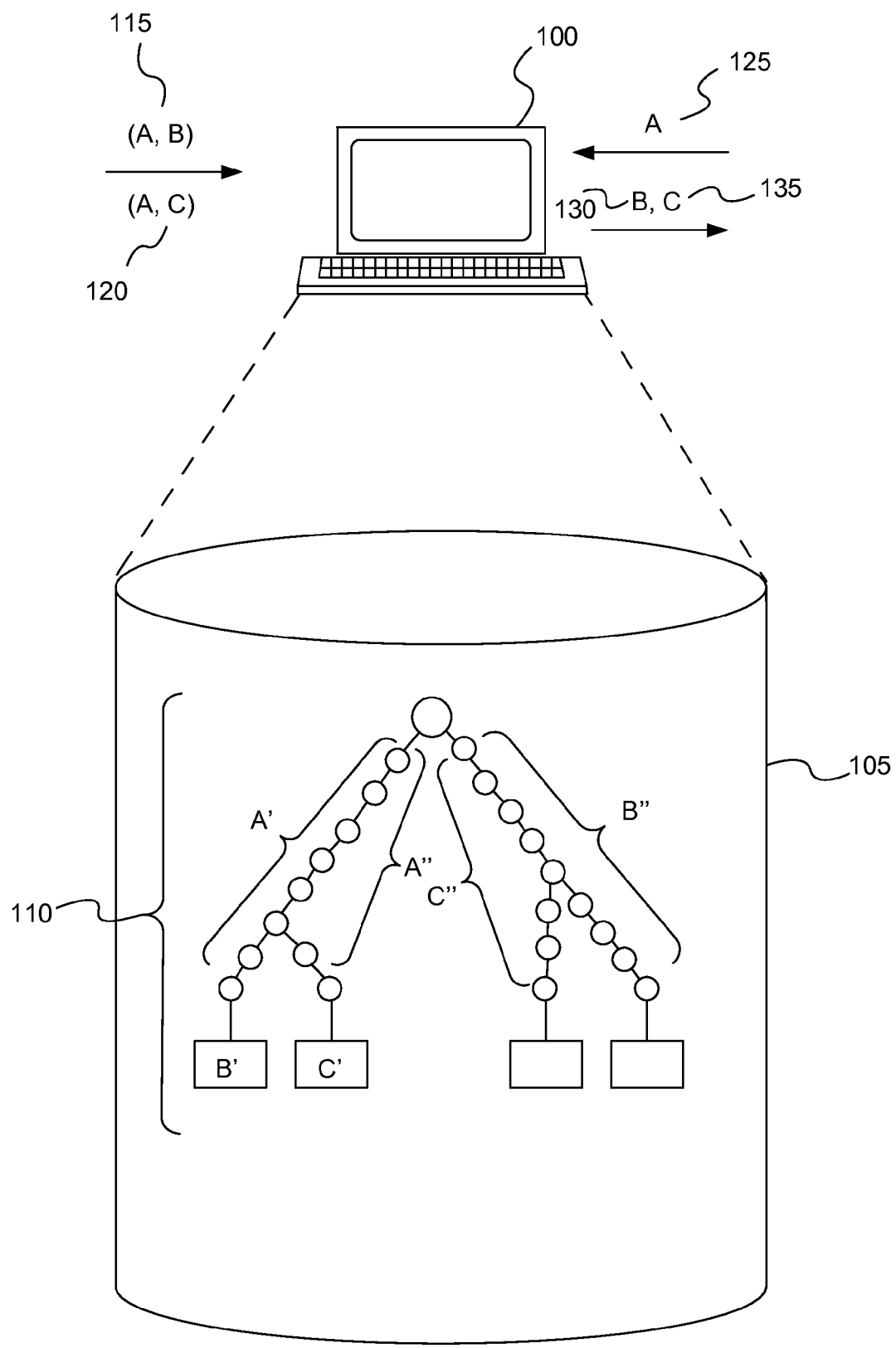
FIG. 1 is an example computing device with a trie and illustrates an example storage and retrieval processes.

FIG. 1 is an example computing device 100 with a trie 110 and illustrates an example storage and retrieval processes. The computing device 100 contains a computer readable medium 105 that stores the trie 110. The computing device 100 stores key-value pair 115 (in the figure, "A-B," where "A" represents the key, and "B" represents the value) and key-value pair 120 (in the figure, "A-C," where "A" represents the key, and "C" represents the value) in the trie 110. Given key 125 (in the figure, "A"), the computing device 100 returns value 130 (in the figure, "B") and value 135 (in the figure, "C").

The computing device 100 receives key-value pair 115. The computing device 100 encodes the original key (in the figure, "A") as an encoded original key (in the figure, "A'") and stores the encoded original key in the trie 110. The computing device 100 encodes the original value (in the figure, "B") as an encoded original value (in the figure, "B'") and stores the encoded original value in the trie 110 as the value for the encoded original key. The computing device 100 encodes the original value as another key (in the figure, "B''") and stores the other key in the trie 110.

The computing device 100 receives a second key-value pair 120. Similar to the process above, the computing device 100 encodes the second original key (in the figure, "B''") and stores the encoded second original key in the trie 110. The computing device 100 encodes the second original value (in the figure, "C") as an encoded second original value (in the figure, "C'") and stores the second encoded original value as the value for the encoded original second key in the trie 110. The computing device 100 encodes the second original value as a second other key (in the figure, "C''") and stores the second other key in the trie 110.

When prompted to retrieve a value for a given key, the computing device 100 returns some or all of the values that correspond to that particular key. For example, the computing device 100 receives the original key 125 (in the figure, "A"). The computing device 100 encodes the original key 125 as an encoded original key. Using the encoded original key, the computing device 100 retrieves a first value of the encoded original key (in the figure, "B'") and a second value of the encoded original key (in the figure, "C'"). The computing device 100 determines a key that is associated with the first value of the encoded original key and a key that is associated with the second value of the encoded original key. The computing device 100 traverses the trie 110 along the nodes representing the key that is associated with the first value of the encoded original key and continues traversing the nodes after the end of the key that is associated with the first value of the encoded original key until the computing device 100 reaches a leaf. The nodes between the end of the key that is associated with the first value of the encoded original key and the leaf corresponds to the value 130 (in the figure, "B").

The computing device 100 again traverses the trie 110 along the nodes representing the key that is associated with the second value of the encoded original key and continues traversing the nodes after the end of the key that is associated with the second value of the encoded original key until the computing device 100 reaches a leaf. The nodes between the end of the key that is associated with the second value of the encoded original key and the leaf corresponds to the value 135 (in the figure, "C").

Figure 2:
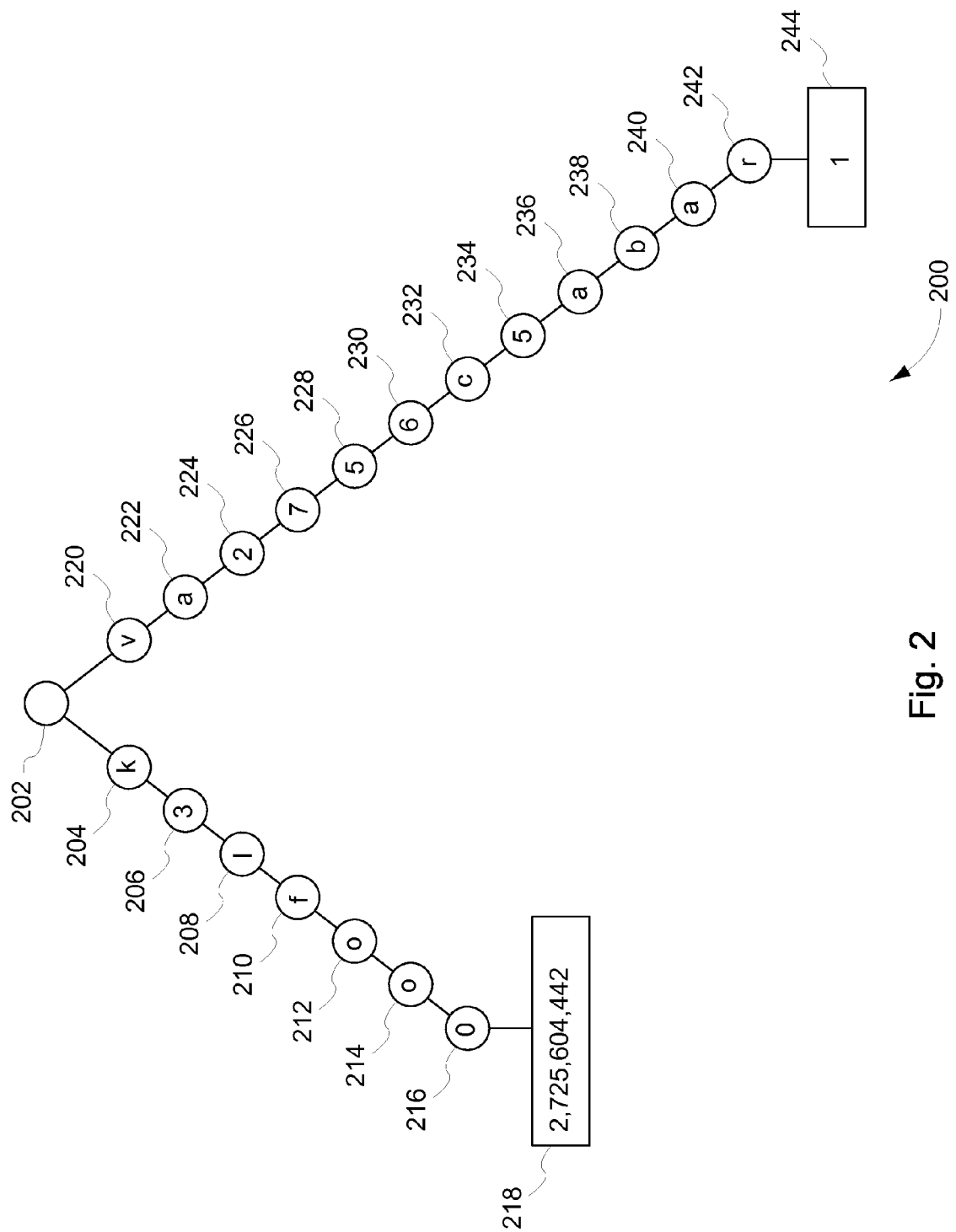
FIG. 2 is an example trie with one key-value pair inserted.

FIG. 2 is an example trie 200 with one key-value pair inserted. The trie 200 is stored on a computing device similar to the computing device 100. The key-value pair inserted in the trie 200 is ("foo", "bar") where "foo" is the original key and "bar" is the original value. The computing device encodes the original key ("foo") and inserts the encoded original key into the trie 200. The encoded original key is a string that includes an encoded original key prefix and a count. The encoded original key prefix includes a fixed portion, a string that indicates the size of the original key, a delimiter, and the original key. The count is an integer that indicates the number of times the computing device has previously entered a key-value pair that has a key that matches the original key.

The fixed portion is one or more bytes used to indicate that the encoded original key corresponds to the original key. In some implementations, the fixed portion is an ASCII character. For example, the fixed portion can be "k." The string that indicates the size of the original key includes the length of the key. For example, if the original key is "foo," then the string that indicates the size of the original key is 3. If the original key is "3695," then the string that indicates the size of the original key is 4. If the original key is "hummingbird," then the string that indicates the size of the original key is 11. In some implementations, the computing device uses hexadecimal notation to indicate the length of the key. For example, if the original key is "foo," then the string that indicates the size of the original key is 3 (hexadecimal notation). If the original key is "3695," then the string that indicates the size of the original key is 4 (hexadecimal notation). If the original key is "hummingbird," then the string that indicates the size of the original key is b (hexadecimal notation). The delimiter is used to separate the fixed portion and the string that indicates the size of the original key from the original key. In some implementations, the delimiter is an ASCII character. For example, the fixed portion can be "|." In FIG. 2, the original key is "foo." If the fixed portion is "k" and if the delimiter is "|," then the original encoded key prefix is "k3|foo."

In some implementations, the computing device can substitute another string in place of the string that indicates the size of the original key. To determine another string, the computing device may use a process that generates unique values based upon the original key. For example, the computing device may determine that a hash value of the original key ("foo") is 45,932. Using the hash value of the original key in place of the string that indicates the size of the original key, the computing device may determine that the original encoded key prefix is "k45932|foo."

The computing device determines an encoded original key prefix and inserts the encoded original key prefix into the trie 200. The computing device inserts the encoded original key prefix into the trie 200 beginning at root node 202 which, in some implementations, does not contain corresponding character.

The computing device determines the count by determining the number of times the computing device has previously entered a key-value pair that has a key that matches the original key. In FIG. 2, the encoded original key prefix ("k3|foo") did not appear in the trie 200. Therefore, the computing device appends a count of "0" to the encoded original key prefix and the encoded original key is "k3|foo0." In some implementations, the count is in hexadecimal notation. For example, if a particular prefix appears 29 times, then the appended count would be "1d" (hexadecimal notation).

The computing device adds a "0" at node 216 and computes the value of the encoded original key to store in leaf 218. In trie 200, leaf 218 stores an encoding of the original value. The encoded original value is an integer. In some implementations, the encoded original value can be a hash of the original value. For example, the encoded original value may be the cyclic redundancy check (CRC) of the original value. In trie 200, the computing device computes the hash value of the original value ("foo"), which is 2,725,604,442 and stores the hash value of the original value in leaf 218.

The computing device determines a second key. The second key is a string that includes a second key prefix and the original value. The second key prefix includes a fixed portion and the hash value of the original value. In some implementations, the hash value of the original value is in hexadecimal form. For example, if the original value ("bar") has a hash value of 2,725,604,442, then the hexadecimal representation of that hash value is "a2756c5a" (hexadecimal notation). In some implementations, the fixed portion is one character. For example, the fixed portion may be "v." If the fixed portion is "v" and the encoded original value is "a2756c5a" (hexadecimal notation), then the second key prefix is "va2756c5a."

The computing device appends the original value to the second key prefix to determine the second key. For example, if the second key prefix is "va2756c5a" and the original value is "bar" then the second key "va2756c5abar." The computing device adds the second key to the trie 200 as shown in FIG. 2.

In some implementations, the computing device adds a value corresponding to the second key. The value corresponding to the second key is the number of times that a key-value pair that contains the original value has been added to the trie. For example, if the computing device stores key-value pairs ("foo", "bar") and ("candy", "bar"), then the second key, which is derived using the value ("bar"), will appear in the trie only once, but will correspond to two original keys. In this case, the computing device can maintain a value corresponding to the second key, which would be "2," to indicate the number of original keys that correspond to the original value. In FIG. 2, the computing device added a "1" to leaf 244 to indicate that the original value ("bar") corresponds to one original key ("foo").

Figure 3:
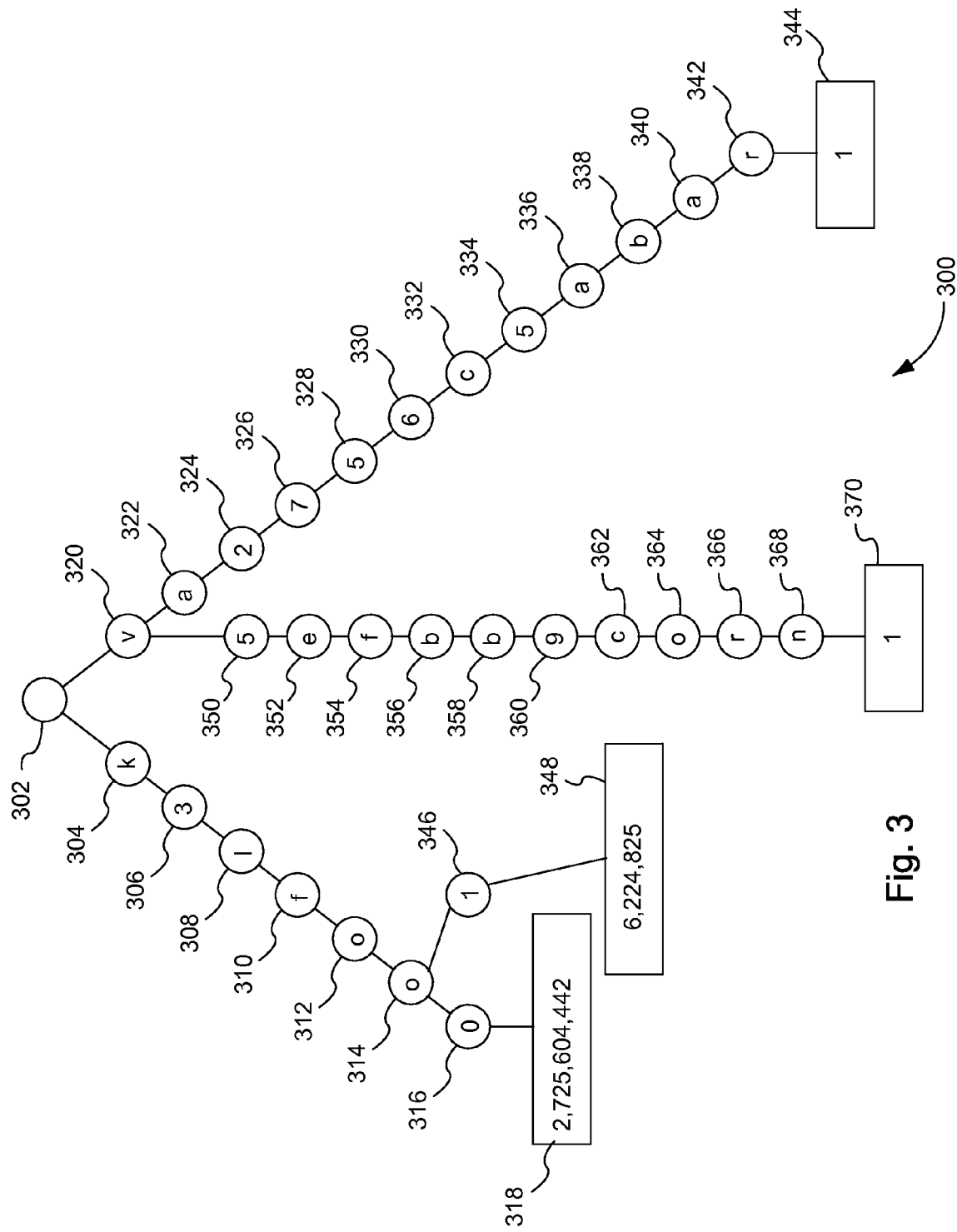
FIG. 3 is an example trie with two key-value pairs inserted.

FIG. 3 is an example trie 300 with two key-value pairs inserted. The key-value pairs inserted in the trie 300 are ("foo", "bar") and ("foo", "corn"). The computing device inserts ("foo", "bar") into the trie 300 using a process similar to the one described in FIG. 2.

To insert a key-value pair ("foo", "corn"), the computing device computes an encoded original key prefix for the original key ("foo") using a process similar to the one described above with "foo." The computing device determines that the encoded original key prefix is "k3|foo" and inserts the encoded original key prefix into the trie 300. The computing device traverses the trie 300 along the path dictated by the encoded original key prefix. If the computing device has not previously inserted the encoded original key prefix, then the computing device appends a count of "0" to the encoded original key prefix. If the computing device has previously inserted the encoded original key prefix, then the computing appends a count indicating the number of previous times that the computing device has inserted the encoded original key prefix. The count appended to the encoded original key prefix is the encoded original key.

In FIG. 3, the computing device reaches a node that corresponds to the last character of the encoded original key prefix because the computing device has already entered the encoded original key prefix into the trie. In this case, the computing device determines, by examining the nodes that branch off the node that corresponds to the last character of the encoded original prefix, that the computing device has entered the encoded original key prefix in the trie 300 once. Therefore, the computing device appends a "1" to the encoded original key prefix and the encoded original key is "k3|foo1."

In some implementations, the count is in hexadecimal notation. For example, if the computing device determines that the encoded original key prefix ("k3l foo") has been inserted into the trie 30 times, then the encoded original key would be "k3|foo1e."

The computing device inserts the encoded original key into the trie. In FIG. 3, the computing device inserted "k3|foo0" and inserts "k3|foo1" into the trie 300 by adding a "1" at node 346. The computing device determines a value of the original encoded key using a process similar to the one described in FIG. 2. In FIG. 3, the computing device determines that the value of the original encoded key is "6,224,825" and inserts the value of the original encoded key in leaf 348.

The computing device determines a second key using a process similar to the one described in FIG. 2. In FIG. 3, the computing devices uses the value of the original encoded key ("5efb9" in hexadecimal notation) and the original value ("corn") to determine that the second key is "v5 efb9corn." The computing device inserts the second key ("v5 efb9corn") into the trie 300. As noted above, in some implementations, the computing device maintains a value of the second key indicating the number of times that the computing device inserted a key-value pair that corresponded to that particular second key. For example, in FIG. 3, the computing device inserts a "1" in leaf 370 because the second key ("v5 efb9corn") was not previously in the trie 300.

Figure 4:
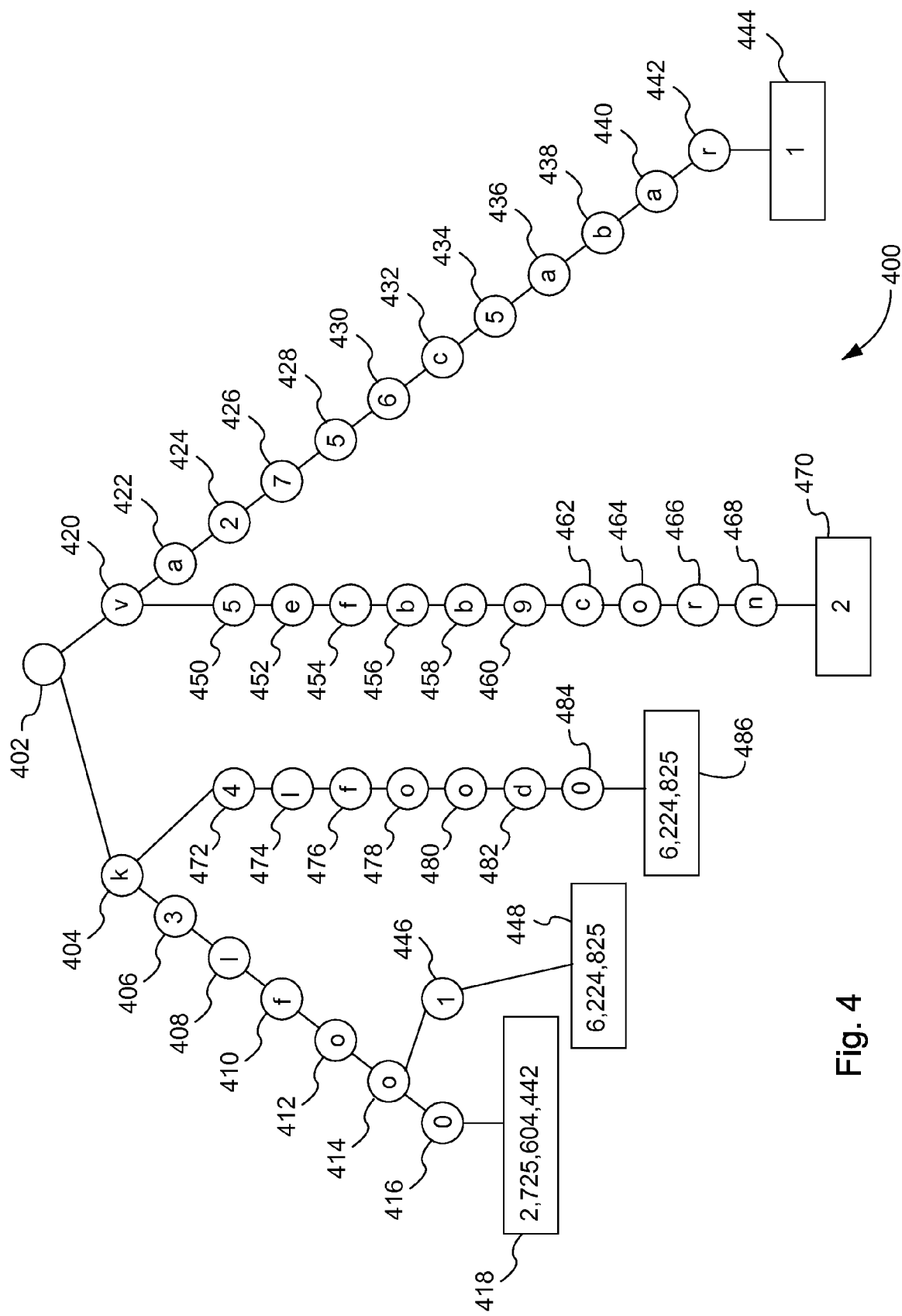
FIG. 4 is an example trie with three key-value pairs inserted.

FIG. 4 is an example trie 400 with three key-value pairs inserted. The key-value pairs inserted into trie 400 are ("foo", "bar"), ("foo", "corn"), and ("food", "corn"). The computing device inserts ("food", "corn") into the trie in a process similar to the one described in FIGS. 2 and 3.

To insert a key-value pair ("food", "corn"), the computing device computes an encoded original key prefix for the original key ("food") using a process similar to the one described above with "foo." The computing device determines that the encoded original key prefix is "k4|food" and inserts the encoded original key prefix into the trie 400. Because the trie 400 did not previously contain the encoded original key prefix ("k4|food"), the computing device determines that the encoded original key is "k4|food0."

The computing device inserts the encoded original key ("k4|foo0") into the trie 400 and uses the original value ("corn") to determine that the value for the encoded original key is "6,224,825." The process used by the computing device to determine the value for the encoded original key ("6,224,825") is similar to the process described in FIGS. 2 and 3. The computing device inserts the encoded original key ("6,224,825") into the trie 400 at leaf 486.

The computing device determines a second key using a process similar to the one described in FIGS. 2 and 3. In FIG. 4, the computing device uses the value of the original encoded key ("5efb9" in hexadecimal notation) and the original value ("corn") to determine that the second key is "v5 efb9corn." The computing device computing device inserts the second key ("v5 efb9corn") into the trie 400. As noted above, in some implementations, the computing device maintains a value of the second key indicating the number of times that the computing device inserted a key-value pair that corresponded to that particular second key. For example, in FIG. 4, the computing device already inserted the second key ("v5 efb9corn") into the trie before inserting the key-value pair ("food", "corn"), therefore, the computing device increments the value of the second key from "1" to "2."

A computing device like the computing device 100 can retrieve an original value from the trie 400 given an original key. For example, given the original key ("foo") the computing device can retrieve the original value ("bar") and ("corn"). Given the original key ("food"), the computing device can retrieve the original key ("corn").

The retrieval process begins by generating an encoded original key prefix from an original key similar to the insertion procedure, so for example, given the original key ("foo"), the computing device determines that the encoded original key prefix is "k3|foo." The computing device traverses the trie along the path of the encoded original key prefix and determines the number of times that the encoded original key prefix was inserted into the trie. The computing device examines the nodes branching off the last node of the prefix to determine the number of times that the encoded original key prefix was inserted into the trie. For example, in FIG. 4, the computing device determines from the nodes branching off of the encoded original key prefix ("k3|foo") that the encoded original key prefix ("k3|foo") has been inserted into the trie 400 two times because two nodes, node 416 and node 446, branch off of node 414.

The computing device traverses the trie along the nodes that branch off of the encoded original key prefix to the leaves and retrieves the values that are associated with the encoded original key prefix. For example, in FIG. 4, the computing device continues to traverse the 400 along node 416 and node 446 and reaches leaf 418 and leaf 448. The computing device retrieves "2,725,604,442" and "6,224,825" as values that are associated with the encoded original key prefix.

The computing device converts the value that is associated with the encoded original key prefix to hexadecimal notation and determines a second key prefix. The second key prefix includes a fixed portion and the value that is associated with the encoded original key prefix in hexadecimal notation. The fixed portion is the same as the fixed portion used to determine the second key during the insertion process. For example, in FIG. 4, the computing device uses the first value that is associated with the encoded original key prefix ("5efbb9") and the fixed portion ("v") to determine that a second key prefix is "v5 efbb9." Using the second value that is associated with the encoded original key prefix ("2756c5a") and the fixed portion ("v"), the computing device determines that another second key prefix is "v2756c5a."

The computing device traverses the trie along the path of the second key prefix. When the computing device reaches the end of the path of the second key prefix, the computing device continues to traverse the trie until the computing device reaches a leaf. The nodes between the end of the prefix and a leaf correspond to the original value. For example, in FIG. 4, the computing device traverses along the path of the second key prefix ("v5 efbb9"). The computing device reaches node 460 at the end of the second key prefix ("v5 efbb9") and continues to leaf 470. The nodes 462 to 468 correspond to the first original value ("corn"). The computing device reaches node 434 at the end of the other second key prefix ("v2756c5a") and continues to leaf 442. The nodes 436 to 440 correspond to the second original value ("bar").

Figure 5:
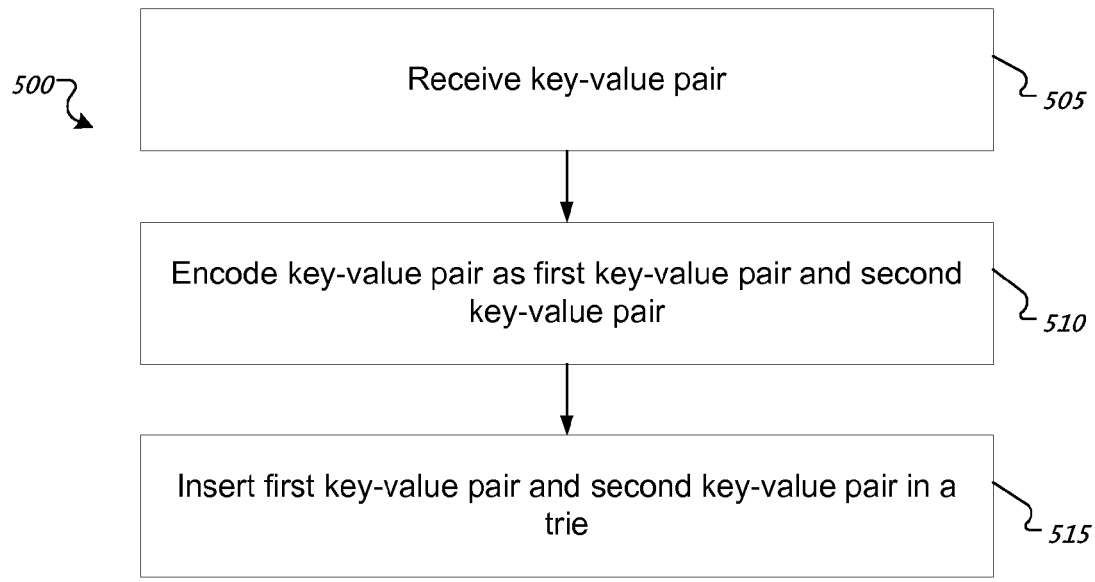
FIG. 5 is a flow chart of an example process to insert a key-value pair into a trie.

FIG. 5 is a flow chart of an example process to insert a key-value pair into a trie. In general, the process 500 receives a key-value pair and inserts the key-value pair into the trie. The process 500 will be described as being performed by a computer system comprising one or more computers, for example, the computing device 100 as shown in FIG. 1.

The system receives a key-value pair including an original key and an original value (505). In some implementations, the original key and the original value are both strings. For example, the original key may be "foo" and the original value may be "bar."

The system encodes the key-value pair (510). The system determines an encoded original key. The encoded original key includes an encoded original key prefix and a f that includes an encoded original key prefix and a count. The encoded original key prefix includes a fixed portion, a string that indicates the size of the original key, a delimiter, and the original key. In some implementations, the fixed portion and the delimiter can be one character. For example, the fixed portion may be "k" and the delimiter may be "|." If the original key is "foo," then the encoded original key prefix is "k3|foo."

The system traverses the trie to determine if the encoded original key prefix exists in the trie. If the encoded original key prefix does not exist in the trie, then the system appends a "0" to the encoded original key prefix. If the encoded original key prefix does exist in the trie, then the system appends the number of nodes that branch off the last node of the encoded original key prefix to the encoded original key prefix. For example, if the encoded original key prefix is "k3|foo" and does not exist in the trie, then the system inserts encoded original key ("k3|foo0") into the trie.

The system encodes the original value. In some implementations, the system encodes the original value by computing a hash value of the original value. The system inserts the encoded original value in a leaf corresponding to the encoded original key (515). For example, if the encoded original key is "k3|foo0" and the hash value of the original value ("bar") is "2,725,604,442", then the system stores the hash value of the original value as the value of the encoded original key ("k3|foo0").

The system determines a second key using the encoded original value (510). The second key includes a fixed portion, the encoded original value, and the original value. In some implementations, the encoded original value is a hexadecimal representation of the hash value of the original value. For example, if the hash value of the original value is "2,725,604,442" then the hexadecimal representation would be "va2756c5a." If the fixed portion is "v," then second key is "va2756c5abar."

The system inserts the second key into the trie (515). In some implementations, the system maintains the number of times that a second key has been inserted into the trie. The number is stored as the value corresponding to the second key. For example, if the system traverses the trie and determines that the second key ("va2756c5abar") has not been inserted into the trie, then the system stores a "0" as the value corresponding to the second key ("va2756c5abar"). If the system traverses the trie and determines that the second key ("va2756c5abar") has been inserted into the trie, then the system increments the value corresponding to the second key ("va2756c5abar").

Figure 6:
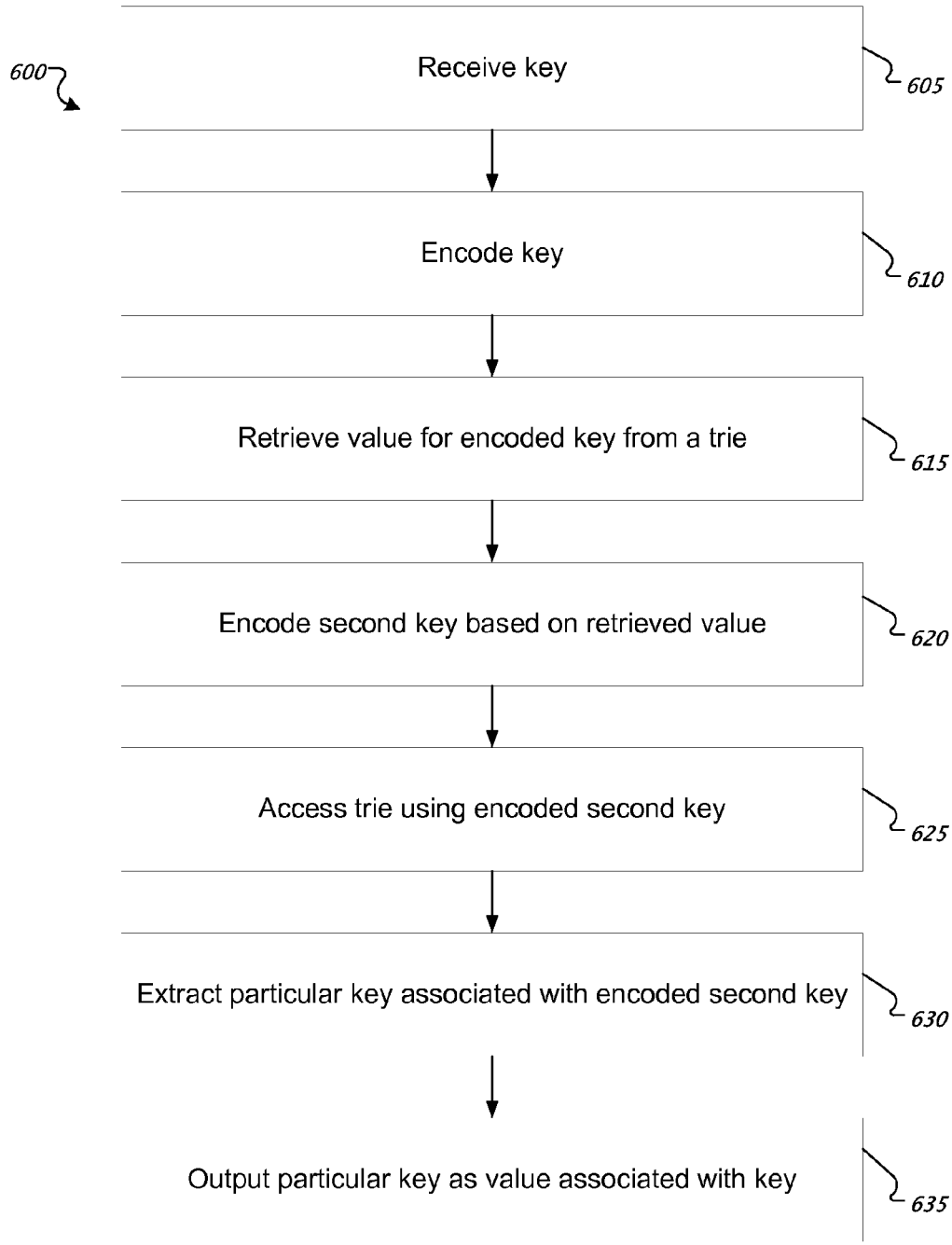
FIG. 6 is a flow chart of an example process to retrieve a value from a trie using a key.

FIG. 6 is a flow chart of an example process to retrieve a value from a trie using a key. In general, the process 600 receives an original key and retrieves the original values that correspond to the original key. The process 600 will be described as being performed by a computer system comprising one or more computers, for example, the computing device 100 as shown in FIG. 1.

The system receives an original key (605). In some implementations, the original key is be a string. For example, the original key may be "foo." The system encodes the original key (610) by determining an encoded original key prefix. The system uses a process similar to the process used to encode the original key during insertion. For example, if the original key is "foo" then the encoded original key prefix is "k3|foo."

The system retrieves a value that corresponds to the encoded original key prefix (615). The system retrieves more than one value that corresponds to the encoded original key prefix where the original key has been inserted into the trie more than once. For example, if the encoded original key prefix "k3|foo" branches to two nodes and leads to two leaves, one containing "2,725,604,442" and the other containing "6,224,825," then the system will retrieve "2,725,604,442" and "6,224,825." If the prefix "k3|foo" branches to one node that leads to one leaf containing "2,725,604,442," then the system will retrieve "2,725,604,442."

The system determines a second key based on the value corresponding to the encoded original key prefix (620). The second key includes a fixed portion and the hexadecimal representation of the value corresponding to the encoded original key prefix. For example, if the fixed portion is "v" and the retrieved value is "2,725,604,442," then the second key is "va2756c5a."

The system accesses the trie using the second key (625). The system traverses the nodes that correspond to the second key and continues to traverse the trie until the system reaches a leaf. For example, if the system reaches the end of the second key ("va2756c5a"), then the system may continue along nodes containing "b," "a," and "r" until the system reaches a leaf.

The system extracts a particular key associated with the second key (630). The system determines the nodes that are located between the second key and a leaf and extracts the characters from those nodes as the particular key. For example, if nodes "b," "a," and "r" are between encoded key "va2756c5a" and a leaf, then the system determines that "bar" is the particular key. The system outputs the particular key as the original value associated with the original key. For example, the system outputs the original value ("bar") as the value corresponding to the original key ("foo").

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a computing device, an original, unencoded key k for which a particular value v from among multiple values that are stored for the original, unencoded key k is to be obtained;
   generating, by the computing device, a trie key that includes an encoded representation of the original, unencoded key k;
   retrieving, from a computer-readable medium of the computing device, a trie value v1 by accessing a trie using the trie key that includes the encoded representation of the original, unencoded key k, wherein the trie is configured to store a given key-value pair as both (i) a first trie key-trie value pair comprising a first trie key that includes a first encoded representation of the given key and a first trie value that includes an encoded representation of the given value, and (ii) a second trie key-trie value pair comprising a second trie key that includes a second encoded representation of the given key and a second trie value that includes an integer;
   generating, by the computing device, a portion of a trie key k1 based on the trie value v1;
   extracting, from the computer readable medium, a remaining portion of the trie key k1 by accessing the trie using the portion of the trie key k1; and
   outputting, by the computing device, the remaining portion of the trie key k1 as the particular value v from among the multiple values that are stored for the original, unencoded key k.

2. The method of claim 1, wherein the trie key that includes the first encoded representation of the original, unencoded key k comprises:
   a first predetermined byte;
   data reflecting a length of the original, unencoded key k;
   a delimiter; and
   the original, unencoded key k.

3. The method of claim 1, further comprising:
   retrieving a second trie value v2 by accessing the trie using the trie key that includes the encoded representation of the original, unencoded key k;
   generating a portion of a trie key k2 based on the trie value v2;
   extracting a remaining portion of the trie key k2 by accessing the trie using the portion of the trie key k2; and
   outputting the remaining portion of the trie key k2 as a second particular value from among the multiple values that are stored for the original, unencoded key k.

4. The method of claim 1, wherein generating a portion of a trie key k1 based on the trie value v1 comprises:
   converting the trie value v1 to hexadecimal form; and
   setting the portion of the trie key k1 to the converted value v1.

5. The method of claim 1, wherein extracting a remaining portion of the trie key k1 by accessing the trie using the portion of the trie key k1 comprises:
   accessing subsequent nodes that are located after the portion of the trie key k1 after accessing the trie using the portion of the trie key k1; and
   classifying the subsequent nodes as the remaining portion of the trie key k1.

6. The method of claim 1, wherein the trie value v1 is an integer.

7. A system comprising:
   one or more computers and one or more storage devices storing instructions that are operable, when executed by the one or more computers, to cause the one or more computers to perform operations comprising:
   receiving, by a computing device, an original, unencoded key k for which a particular value v from among multiple values that are stored for the original, unencoded key k is to be obtained;
   generating, by the computing device, a trie key that includes an encoded representation of the original, unencoded key k;
   retrieving, from a computer-readable medium of the computing device, a trie value v1 by accessing a trie using the trie key that includes the encoded representation of the original, unencoded key k, wherein the trie is configured to store a given key-value pair as both (i) a first trie key-trie value pair comprising a first trie key that includes a first encoded representation of the given key and a first trie value that includes an encoded representation of the given value, and (ii) a second trie key-trie value pair comprising a second trie key that includes a second encoded representation of the given key and a second trie value that includes an integer;
   generating, by the computing device, a portion of a trie key k1 based on the trie value v1;
   extracting, from the computer readable medium, a remaining portion of the trie key k1 by accessing the trie using the portion of the trie key k1; and
   outputting, by the computing device, the remaining portion of the trie key k1 as the particular value v from among the multiple values that are stored for the original, unencoded key k.

8. The system of claim 7, wherein the trie key that includes the first encoded representation of the original, unencoded key k comprises:
   a first predetermined byte;
   data reflecting a length of the original, unencoded key k;
   a delimiter; and
   the original, unencoded key k.

9. The system of claim 7, wherein the operations further comprise:
   retrieving a second trie value v2 by accessing the trie using the trie key that includes the first encoded representation of the original, unencoded key k;
   generating a portion of a trie key k2 based on the trie value v2;
   extracting a remaining portion of the trie key k2 by accessing the trie using the portion of the trie key k2; and
   outputting the remaining portion of the trie key k2 as a second particular value from among the multiple values that are stored for the original, unencoded key k.

10. The system of claim 7, wherein generating a portion of a trie key k1 based on the trie value v1 comprises:
converting the trie value v1 to hexadecimal form; and
setting the portion of the trie key k1 to the converted tie value v1.

11. The system of claim 7, wherein extracting a remaining portion of the trie key k1 by accessing the trie using the portion of the trie key k1 comprises:
accessing subsequent nodes that are located after the portion of the trie key k1 after accessing the trie using the portion of the trie key k1; and
classifying the subsequent nodes as the remaining portion of the trie key k1.

12. The system of claim 7, wherein the trie value v1 is an integer.

13. A non-transitory computer-readable medium storing software comprising instructions executable by one or more computers which, upon such execution, cause the one or more computers to perform operations comprising:
receiving, by a computing device, an original, unencoded key k for which a particular value v from among multiple values that are stored for the original, unencoded key k is to be obtained;
generating, by the computing device, a trie key that includes an encoded representation of the original, unencoded key k;
retrieving, from a computer-readable medium of the computing device, a trie value v1 by accessing a trie using the trie key that includes the encoded representation of the original, unencoded key k, wherein the trie is configured to store a given key-value pair as both (i) a first trie key-trie value pair comprising a first trie key that includes a first encoded representation of the given key and a first trie value that includes an encoded representation of the given value, and (ii) a second trie key-trie value pair comprising a second trie key that includes a second encoded representation of the given key and a second trie value that includes an integer;
generating, by the computing device, a portion of a trie key k1 based on the trie value v1;
extracting, from the computer readable medium, a remaining portion of the trie key k1 by accessing the trie using the portion of the trie key k1; and
outputting, by the computing device, the remaining portion of the trie key k1 as the particular value v from among the multiple values that are stored for the original, unencoded key k.

14. The medium of claim 13, wherein the trie key that includes the first encoded representation of the original, unencoded key k comprises:
a first predetermined byte;
data reflecting a length of the original, unencoded key k;
a delimiter; and
the original, unencoded key k.

15. The medium of claim 13, wherein the operations further comprise:
retrieving a second trie value v2 by accessing the trie using the trie key that includes the first encoded representation of the original, unencoded key k;
generating a portion of a trie key k2 based on the trie value v2;
extracting a remaining portion of the trie key k2 by accessing the trie using the portion of the trie key k2; and
outputting the remaining portion of the trie key k2 as a second particular value from among the multiple values that are stored for the original, unencoded key k.

16. The medium of claim 13, wherein generating a portion of a trie key k1 based on the trie value v1 comprises:
converting the trie value v1 to hexadecimal form; and
setting the portion of the trie key k1 to the converted tie value v1.

17. The medium of claim 13, wherein extracting a remaining portion of the trie key k1 by accessing the trie using the portion of the trie key k1 comprises:
accessing subsequent nodes that are located after the portion of the trie key k1 after accessing the trie using the portion of the trie key k1; and
classifying the subsequent nodes as the remaining portion of the trie key k1.

18. The medium of claim 13, wherein the trie value v1 is an integer.

* * * * *